US009488993B2

(12) United States Patent
Koopman

(10) Patent No.: US 9,488,993 B2
(45) Date of Patent: Nov. 8, 2016

(54) SYSTEMS AND METHODS FOR SELECTING TEMPERATURE SETPOINTS

(71) Applicant: Emerson Electric Co., St. Louis, MO (US)

(72) Inventor: Wayne A. Koopman, Red Bud, IL (US)

(73) Assignee: Emerson Electric Co., St. Louis, MO (US)

( * ) Notice: Subject to any disclaimer, the term of this patent is extended or adjusted under 35 U.S.C. 154(b) by 423 days.

(21) Appl. No.: 14/107,926

(22) Filed: Dec. 16, 2013

(65) Prior Publication Data
US 2015/0168961 A1 Jun. 18, 2015

(51) Int. Cl.
*G05D 23/19* (2006.01)
(52) U.S. Cl.
CPC .................... *G05D 23/1902* (2013.01)
(58) Field of Classification Search
CPC ..... B60R 25/04; B60R 25/24; B60R 25/102; B60R 25/33; B60R 25/00; B60R 25/20; B60R 25/241; B60R 2325/205; B60R 2325/306
USPC ........................................ 340/5.31
See application file for complete search history.

(56) References Cited

U.S. PATENT DOCUMENTS

| 4,213,174 | A | * | 7/1980 | Morley | G05B 19/05 700/16 |
| 5,950,573 | A | * | 9/1999 | Shellenberger | F23D 14/82 122/18.31 |
| 6,069,998 | A | * | 5/2000 | Barnes | H05B 3/82 219/520 |
| 8,322,312 | B2 | * | 12/2012 | Strand | G05D 23/1919 122/14.22 |
| 2013/0193221 | A1 | * | 8/2013 | Buescher | F24H 9/2021 237/8 A |

* cited by examiner

*Primary Examiner* — Mark Blouin
(74) *Attorney, Agent, or Firm* — Armstrong Teasdale LLP

(57) ABSTRACT

A controller for operating a water heater includes an input device configured to input a temperature setpoint for the water heater and a processor coupled to the input device. The input device is configured to input at least one restricted setpoint above a predetermined maximum temperature. The processor is configured to detect that an unlock sequence has been input using at least the input device, and in response to the detection of the unlock sequence, permit the water heater to operate at the restricted setpoint above the predetermined maximum temperature when the restricted setpoint is selected using the input device within a predetermined length of time after the detection of the unlock sequence.

21 Claims, 5 Drawing Sheets

SYSTEMS AND METHODS FOR SELECTING TEMPERATURE SETPOINTS

FIELD

The field of the disclosure relates generally to controlling water heaters, and more particularly, to unlocking restricted temperature setpoints for a water heater.

BACKGROUND

Water heaters are commonly used in homes and businesses to heat water before the water is dispensed. In operation, water is supplied to the water heater, and then heated to a desired temperature using a gas burner, an electric heater, or another heating element. Once the water is heated to the desired temperature, the water heater stops heating but occasionally applies heat to maintain the water at the desired temperature.

Water heaters typically include a control system for controlling the energy or heat applied to the water. The control system typically includes a temperature sensor, such as a thermistor, that provides an input to the control system indicating water temperature. The control system also includes one or more input devices that enable a user to select a setpoint corresponding to the desired temperature.

Some setpoints may correspond to relatively high water temperatures. To facilitate energy savings, temperature setpoints above a predetermined limit are typically unavailable in a default condition so that a user cannot accidentally select a temperature above the predetermined limit. However, in some circumstances, a user may want to operate the water heater at a temperature setpoint above the limit. For example, a user may want to operate the water heater above the limit to increase the supply of hot water. Accordingly, at least some control systems enable a user to provide a sequence of inputs that permit the water heater to operate at previously unavailable temperature setpoints above the limit. However, these input sequences may be relatively complicated, costly, and impractical. For example, the sequence may require a user to manipulate multiple buttons and/or switches on the control system while simultaneously monitoring a plurality of indicators to determine a current status or condition of the control system. A more satisfactory system is needed.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a controller for operating a water heater includes an input device configured to input a temperature setpoint for the water heater, the input device configured to input at least one restricted setpoint above a predetermined maximum temperature, and a processor coupled to the input device. The processor is configured to detect that an unlock sequence has been input using at least the input device, and in response to the detection of the unlock sequence, permit the water heater to operate at the restricted setpoint above the predetermined maximum temperature when the restricted setpoint is selected using the input device within a predetermined length of time after the detection of the unlock sequence.

In another aspect, a processor for a controller of a water heater is configured to detect that an unlock sequence has been input using at least an input device coupled to the processor and configured to input at least one restricted setpoint above a predetermined maximum temperature, and in response to the detection of the unlock sequence, permit the water heater to operate at the restricted setpoint above the predetermined maximum temperature when the restricted setpoint is selected using the input device within a predetermined length of time after the detection of the unlock sequence.

In yet another aspect, a method for operating a water heater using a controller that includes a processor coupled to an input device configured to input at least one restricted setpoint above a predetermined maximum temperature is provided. The method includes detecting, using the processor, that an unlock sequence has been input using at least the input device, and in response to the detection of the unlock sequence, permitting, using the processor, the water heater to operate at the restricted setpoint above the predetermined maximum temperature when the restricted setpoint is selected using the input device within a predetermined length of time after the detection of the unlock sequence.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

DETAILED DESCRIPTION

Figure 1:
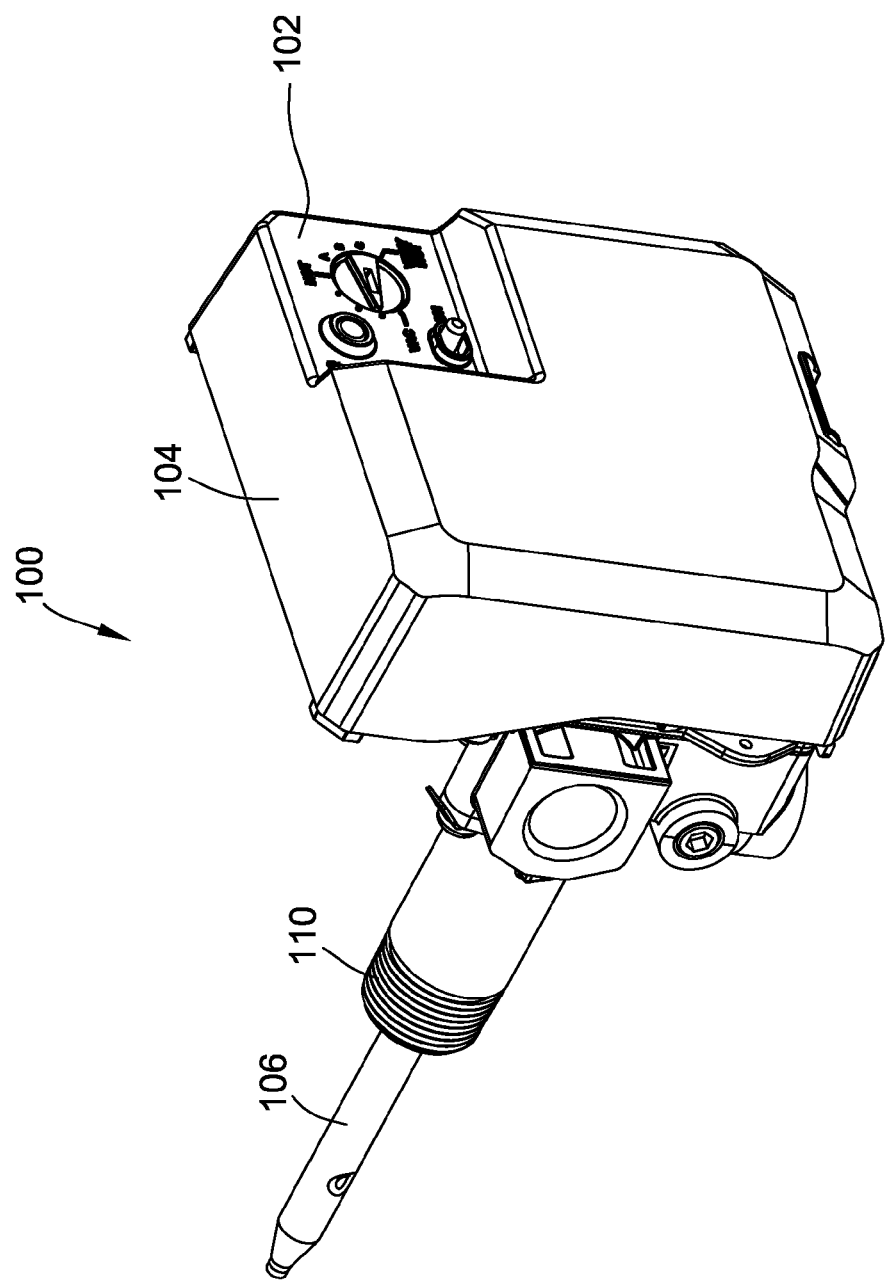
FIG. 1 is a perspective view of one embodiment of a controller for a water heater.
Figure 2:
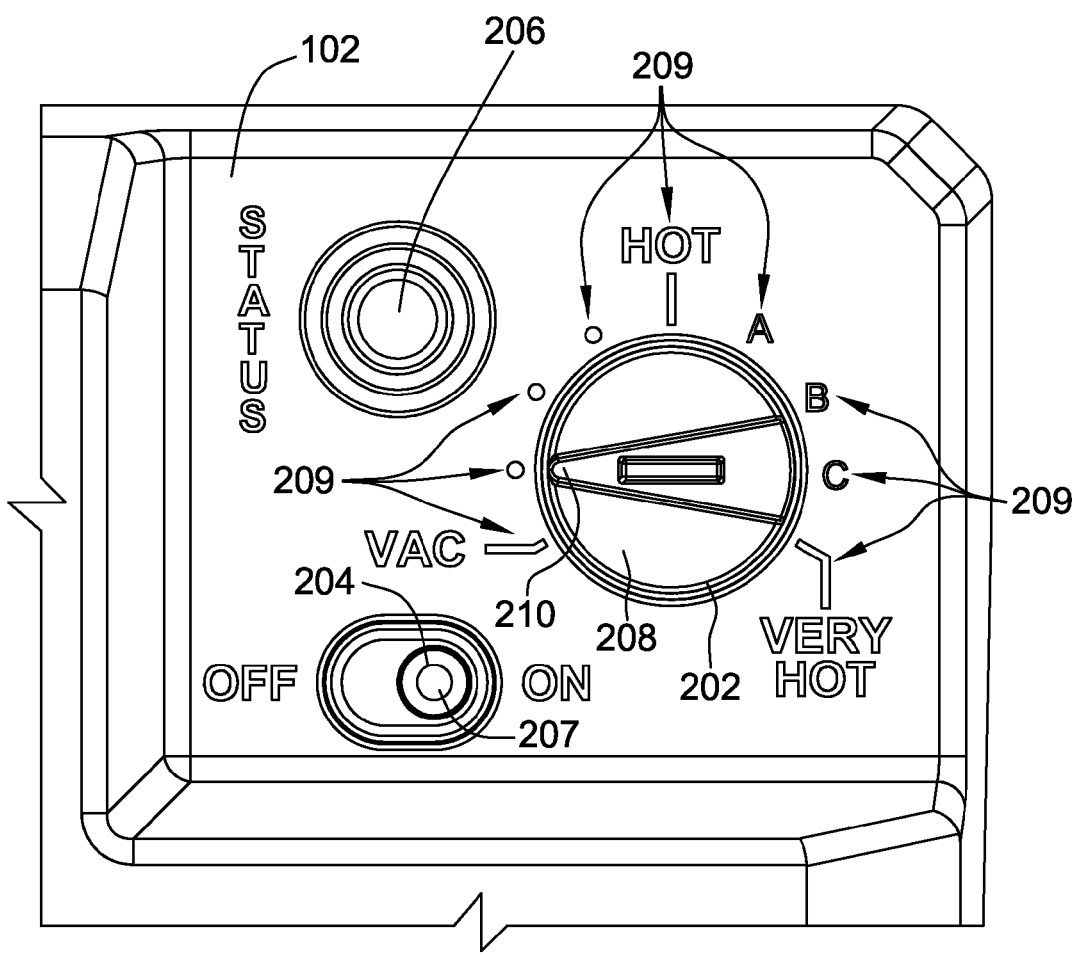
FIG. 2 is an enlarged view of a control panel of the controller shown in FIG. 2.
Figure 3:
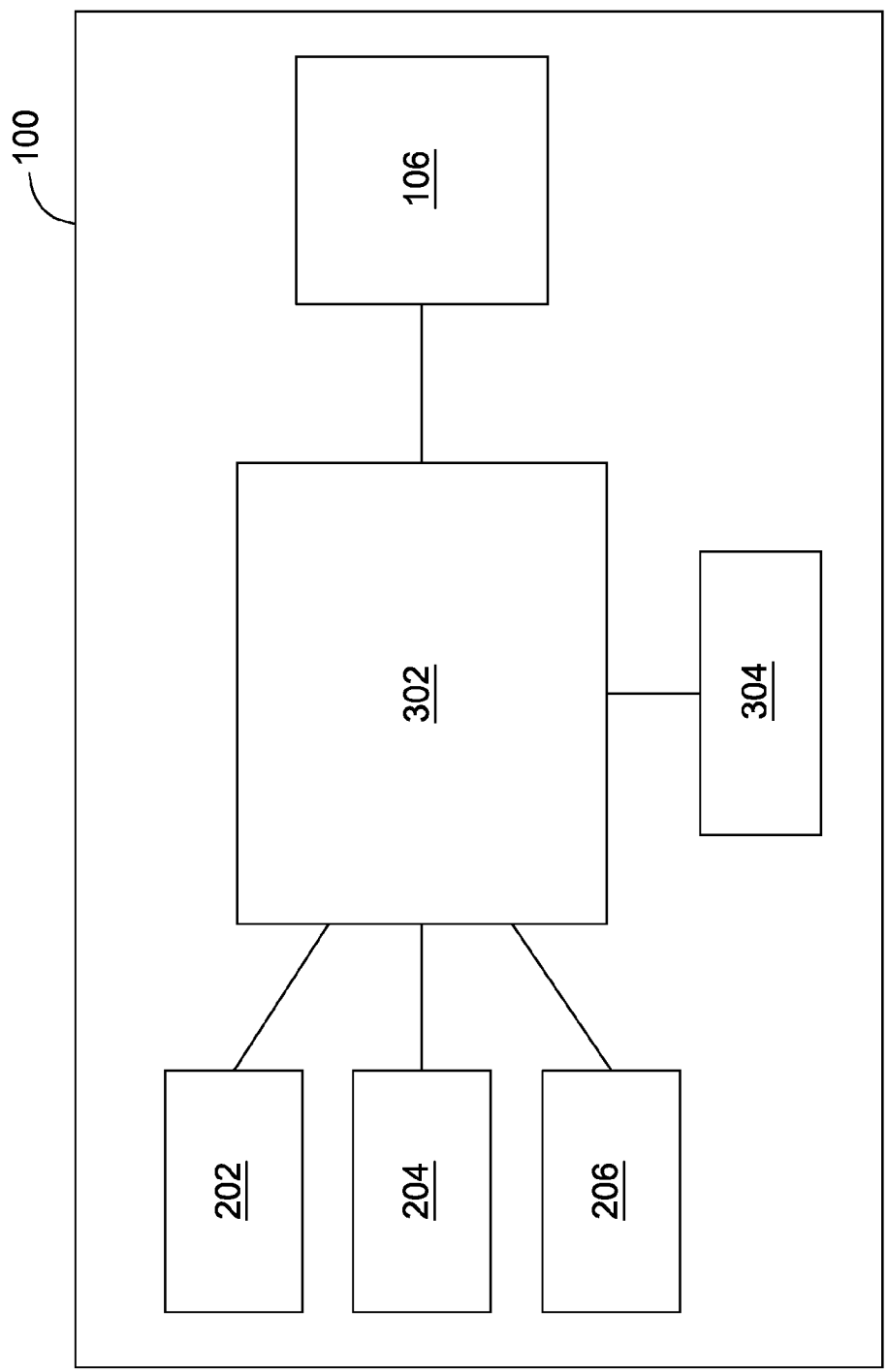
FIG. 3 is a block diagram of the controller shown in FIG. 1.

Referring to FIG. 1, a controller for a water heater is indicated generally at 100. FIG. 2 is an enlarged view of a control panel 102 of controller 100, and FIG. 3 is a block diagram of controller 100. In this embodiment, controller 100 is operable to control a gas water heater (not shown), and more specifically, a power vented gas water heater. Alternatively, controller 100 may be operable to control any type of water heater.

Controller 100 includes a housing 104 and a temperature sensor 106 extending from housing 104. Housing 104 includes control panel 102, as described in more detail below. In this embodiment, temperature sensor 106 is a thermistor. Alternatively, temperature sensor 106 may be any device configured to measure a temperature within the water heater. Controller 100 further includes a threaded portion 110 that facilitates attaching controller 100 to the water heater. Specifically, threaded portion 110 engages a threaded aperture defined in the water heater such that temperature sensor 106 is positioned inside of the water heater and housing 104 is positioned outside of the water heater.

Controller 100 enables a user to control a temperature of water stored in the water heater. Specifically, a user selects a temperature setpoint using control panel 102. As described in detail below, controller 100 determines whether or not the selected temperature setpoint is restricted (i.e., whether or not the water heater is permitted to operate at the selected temperature). If the temperature setpoint is not restricted, controller 100 selectively enables gas flow (e.g., by selectively energizing a gas valve) to a burner operable to heat water stored in the water heater. Specifically, the gas flow is selectively enabled such that the temperature of water stored in water heater, as measured by temperature sensor 106, substantially matches the temperature setpoint selected on control panel 102.

As shown in FIG. 2, control panel 102 includes a first input device 202, a second input device 204, and an indicator 206. Second input device 204 is a power switch 207 in this embodiment. Power switch 207 determines whether or not controller 100 is activated (i.e., actively monitoring and controlling a temperature of water in the water heater). Accordingly, power switch 207 is switchable between an on state and an off state.

In this embodiment, first input device 202 is a rotary knob 208 that enables a user to select one of a plurality of temperature setpoints 209. Rotary knob 208 is coupled to a potentiometer (not shown) that is adjusted based on a position of rotary knob 208. Specifically, rotary knob 208 includes a pointer 210 (e.g., an arrow). To select a temperature setpoint 209, the user rotates rotary knob 208 until pointer 210 points to the desired temperature setpoint 209. Alternatively, first input device 202 may be any input device that enables a user to specify a temperature setpoint 209 for the water heater. For example, first input device 202 may include a keypad, a switch, or other suitable input mechanisms.

As shown in FIG. 2, control panel 102 includes nine selectable temperature setpoints 209 in this embodiment. Specifically, "VAC" is the lowest temperature setpoint 209, "VERY HOT" is the highest temperature setpoint 209, and "HOT" is an intermediate temperature setpoint 209. Each setpoint 209 corresponds to a different temperature. For example, setpoint "VAC", setpoints between setpoint "VAC" and setpoint "HOT", setpoint "HOT", setpoint "A", setpoint "B", setpoint "C", and setpoint "VERY HOT" may correspond to 70 degrees Fahrenheit (° F.), 100° F., 105° F., 110° F., 120° F., 130° F., 140° F., 150° F., and 160° F., respectively. Alternatively, control panel 102 may include any suitable number of temperature setpoints 209.

Indicator 206 indicates a status of controller 100, as described herein. In this embodiment, indicator 206 is a light-emitting diode (LED). For example, indicator 206 may be a multi-color LED, such as an LED capable of selectively emitting green, yellow, and red light. Alternatively, indicator 206 may be any audio and/or visual device capable of indicating a status of controller 100. For example, in one embodiment, indicator 206 is a speaker that provides an audible indication (e.g., a chirp or buzz) of the status of controller 100.

As shown in FIG. 3, controller 100 includes a processor 302 and a memory device 304 in this embodiment. Processor 302 is communicatively coupled to first input device 202, second input device 204, and indicator 206, as well as memory device 304 and temperature sensor 106.

Processor 302 determines whether the water heater is permitted to operate at a selected temperature setpoint 209. Specifically, at least some temperature setpoints 209 correspond to relatively high water temperatures. In this embodiment, in a default state, temperature setpoints 209 above a maximum temperature are restricted (i.e., inaccessible). That is, if a user manipulates first input device 202 to select a restricted temperature setpoint, to facilitate energy savings, controller 100 will not selectively enable gas flow to heat water to the restricted temperature setpoint. Rather, controller 100 will selectively enable gas flow to heat water to, but not above, the maximum temperature. In this embodiment, the maximum temperature is 140° F. (i.e., setpoint "B"). Alternatively, the maximum temperature may be any suitable temperature. To access restricted temperature setpoints above the maximum temperature (e.g., if a user desires to increase a supply of hot water), a user must input an unlock sequence using control panel 102, as described herein.

Executable instructions are stored in memory device 304, and controller 100 performs one or more operations described herein by programming processor 302. For example, processor 302 may be programmed by encoding an operation as one or more executable instructions and by providing the executable instructions in memory device 304.

Processor 302 may include one or more processing units (e.g., in a multi-core configuration). Further, processor 302 may be implemented using one or more heterogeneous processor systems in which a main processor is present with secondary processors on a single chip. As another illustrative example, processor 302 may be a symmetric multi-processor system containing multiple processors of the same type. Further, processor 302 may be implemented using any suitable programmable circuit including one or more systems and microcontrollers, microprocessors, programmable logic controllers (PLCs), reduced instruction set circuits (RISC), application specific integrated circuits (ASIC), programmable logic circuits, field programmable gate arrays (FPGA), and any other circuit capable of executing the functions described herein. In this embodiment, processor 302 determines whether the user has input an unlock sequence, and permits operation of controller 100 and the water heater accordingly, as described herein.

Memory device 304 includes one or more devices that enable information such as executable instructions and/or other data to be stored and retrieved. Memory device 304 may include one or more computer readable media, such as, without limitation, dynamic random access memory (DRAM), static random access memory (SRAM), non-volatile random access memory (NVRAM), a solid state disk, and/or a hard disk. Memory device 304 may be configured to store, without limitation, application source code, application object code, source code portions of interest, object code portions of interest, configuration data, execution events and/or any other type of data. In some embodiments, memory device 304 is part of processor 302.

Two example unlock sequences are described herein in detail. However, those of skill in the art will appreciate that other unlock sequences not specifically described herein are within the spirit and scope of the disclosure.

Figure 4:
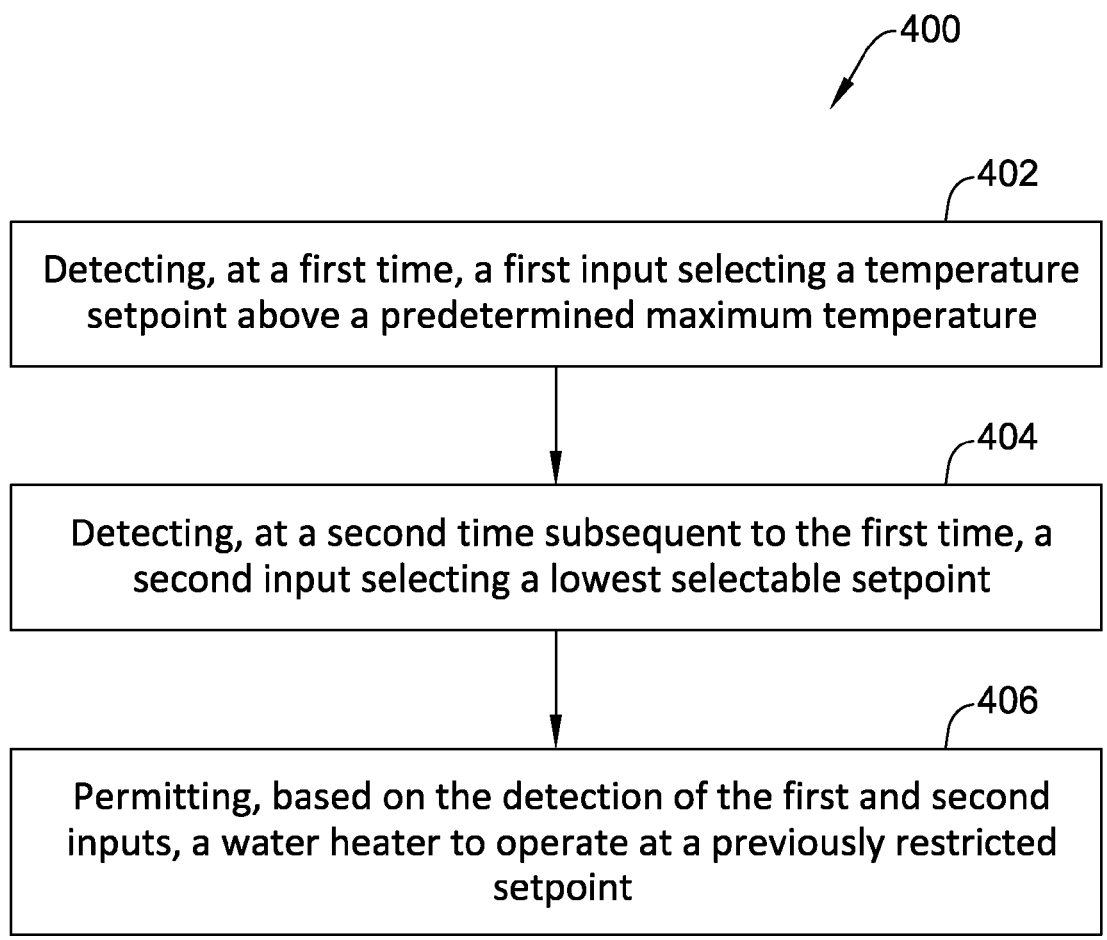
FIG. 4 is a flowchart of a method for use in controlling a water heater based on a first unlock sequence.

FIG. 4 is a flowchart of a method 400 for controlling a water heater using a first unlock sequence. A user may perform the first unlock sequence using only first input device 202. As described above, before the first unlock sequence is performed by a user, temperature setpoints 209 above a maximum temperature are restricted. The first unlock sequence includes a first input using first input device 202 followed by a second input using first input device 202, as described herein.

To initiate the first unlock sequence, the user performs a first input, using first input device 202, that selects a restricted setpoint (e.g., turning rotary knob 208 to select the "VERY HOT" setpoint). At this time, the water heater is not permitted to operate at the restricted setpoint. In step 402 of method 400, processor 302 detects the first input (e.g., from the potentiometer) at a first time. In this embodiment, indicator 206 provides an indication that processor 302 has detected the first input. For example, indicator 206 may blink repeatedly (e.g., five times) to notify the user that processor 302 has detected the first input. Alternatively, indicator 206 may provide any suitable indication notifying the user that processor 302 has detected the first input.

To complete the first unlock sequence, the user performs a second input, using first input device 202, that selects a lowest selectable setpoint (e.g., turning rotary knob 208 to select the "VAC" setpoint). In step 404 of method 400, processor 302 detects the second input at a second time subsequent to the first time. In some embodiments, to complete the first unlock sequence, input device 202 must be set to the lowest selectable setpoint for a predetermined length of time (e.g., 5 seconds). Alternatively, input device 202 must simply be set to the lowest selectable setpoint to complete the first unlock sequence.

Indicator 206 of this embodiment also provides an indication that processor 302 has detected the second input. For example, indicator 206 may blink repeatedly (e.g., five times) to notify the user that processor 302 has detected the second input. Alternatively, indicator 206 may provide any suitable indication notifying the user that processor 302 has detected the second input.

At step 406 of method 400, once processor 302 detects the first and second inputs that correspond to the first unlock sequence, processor 302 "unlocks" all temperature setpoints 209 above the maximum temperature. That is, processor 302 permits the water heater to operate at all previously restricted setpoints. In this embodiment, the user has a predetermined length of time to select a previously restricted setpoint. If the predetermined length of time expires, and the user has not selected a previously restricted setpoint, all temperature setpoints 209 above the maximum temperature will return to being restricted, although all temperature setpoints 209 at or below the maximum temperature will remain available. The predetermined length of time may be, for example, 10 seconds.

Accordingly, to perform the first unlock sequence, the user performs a first input selecting a restricted setpoint, and subsequently performs a second input selecting the lowest selectable setpoint. Processor 302 detects the first and second inputs, and permits the water heater to operate at the previously restricted setpoints (as well as the previously unrestricted setpoints) as a result.

Figure 5:
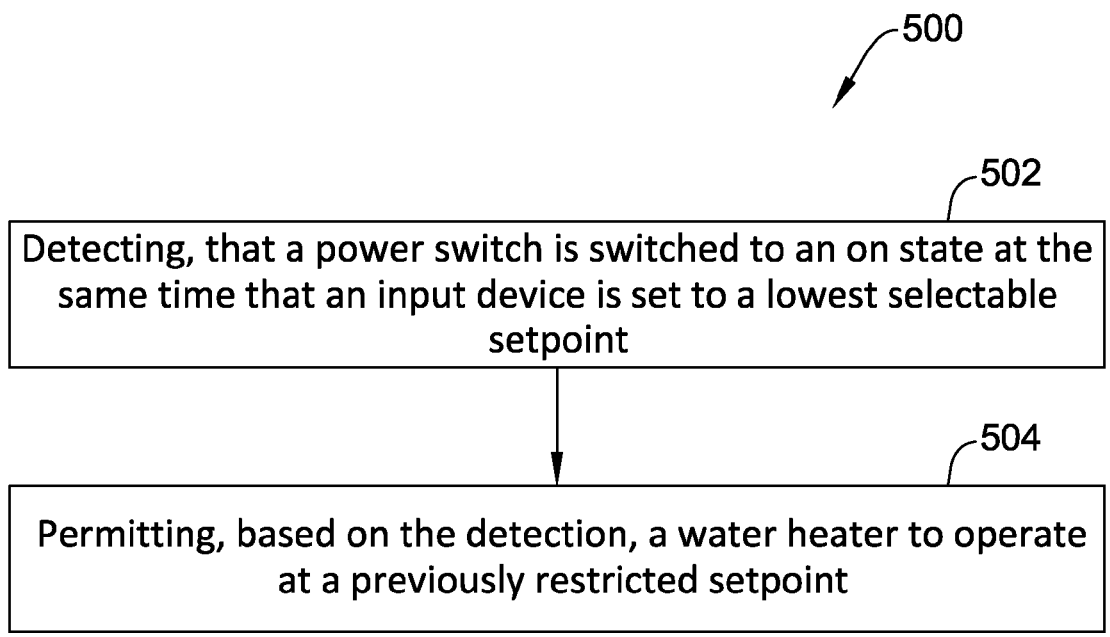
FIG. 5 is a flowchart of a method for use in controlling a water heater based on a second unlock sequence.

FIG. 5 is a flowchart of a method 500 for controlling a water heater using a second unlock sequence. A user performs the second unlock sequence using first input device 202 and second input device 204. As described above, before the second unlock sequence is performed by a user, temperature setpoints 209 above a maximum temperature are restricted.

To perform the second unlock sequence, the user switches power switch 207 to the off state, and performs an input, using first input device 202 that selects a lowest selectable setpoint (e.g., turning rotary knob 208 to select the "VAC" setpoint). These actions may be performed in any order (i.e., switching to the off state and then selecting the lowest selectable setpoint, selecting the lowest selectable setpoint and then switching to the off state, or performing both actions simultaneously). When the power switch 207 is subsequently switched to the on state at the same time that first input device 202 is set to a lowest selectable setpoint, the second unlock sequence is accomplished.

As shown in FIG. 5, at step 502, processor 302 detects that power switch 207 is switched to the on state with the first input device 202 set to the lowest selectable setpoint. In this embodiment, indicator 206 provides an indication that processor 302 has detected completion of the second unlock sequence. For example, indicator 206 may blink repeatedly (e.g., five times) to notify the user that processor 302 has detected completion of the second unlock sequence. Alternatively, indicator 206 may provide any suitable indication notifying the user that processor 302 has detected completion of the second unlock sequence.

At step 504 of method 500, once processor 302 detects inputs that correspond to the second unlock sequence, processor 302 "unlocks" all temperature setpoints 209 above the maximum temperature. That is, processor 302 permits the water heater to operate at all previously restricted setpoints. In this embodiment, the user has a predetermined length of time to select a previously restricted setpoint. If the predetermined length of time expires, and the user has not selected a previously restricted setpoint, all temperature setpoints 209 above the maximum temperature will return to being restricted. The predetermined length of time may be, for example, 10 seconds. Notably, the predetermined length of time may start to run from the time when processor 302 detects inputs corresponding to the second unlock sequence.

Accordingly, to perform the second unlock sequence, the user switches power switch 207 to the on state with the first input device 202 set to the lowest selectable setpoint. Processor 302 detects the second unlock sequence, and permits the water heater to operate at the previously restricted setpoints as a result.

Embodiments of the methods and systems described herein achieve superior results compared to prior methods and systems. For example, unlike at least some known controllers that require a plurality of indicators and inputs to access restricted setpoints, the controller described herein may use a single input device and a single indicator to perform an unlock sequence. Further, the systems and methods described herein prevent users from accidentally selecting setpoints associated with relatively high temperatures, but allow users to deliberately access such setpoints with relatively simple and straightforward inputs. Moreover, the systems and methods described herein may be less expensive to implement than at least some known controllers.

Example embodiments of systems and methods for controlling a water heater are described above in detail. The system is not limited to the specific embodiments described herein, but rather, components of the system may be used independently and separately from other components described herein. For example, the controller and processor described herein may also be used in combination with other systems and methods, and are not limited to practice with only the system as described herein.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A controller for operating a water heater, the controller comprising:
    an input device configured to input a temperature setpoint for the water heater, the input device configured to input at least one restricted setpoint above a predetermined maximum temperature; and
    a processor coupled to the input device, the processor configured to:
        detect that an unlock sequence has been input using at least the input device; and
        in response to the detection of the unlock sequence, permit the water heater to operate at the restricted setpoint above the predetermined maximum temperature when the restricted setpoint is selected using the input device within a predetermined length of time after the detection of the unlock sequence.

2. The controller of claim 1, wherein to detect that an unlock sequence has been input, the processor is configured to:
    detect, at a first time, a first input on the input device that selects a setpoint above the predetermined maximum temperature; and
    detect, at a second time subsequent to the first time, a second input on the input device that selects a lowest selectable setpoint.

3. The controller of claim 1, wherein to detect that an unlock sequence has been input, the processor is configured to detect that a power switch for the controller is switched to an on state at the same time that the input device is set to a lowest selectable setpoint.

4. The controller of claim 1, wherein the input device comprises a rotary knob coupled to a potentiometer.

5. The controller of claim 1, further comprising an indicator coupled to the processor, the indicator configured to notify a user that the unlock sequence has been detected.

6. The controller of claim 1, wherein the unlock sequence includes inputs made using only the input device.

7. The controller of claim 1, wherein the predetermined maximum temperature is approximately 140° F.

8. A processor for a controller of a water heater, the processor configured to:
    detect that an unlock sequence has been input using at least an input device coupled to the processor and configured to input at least one restricted setpoint above a predetermined maximum temperature; and
    in response to the detection of the unlock sequence, permit the water heater to operate at the restricted setpoint above the predetermined maximum temperature when the restricted setpoint is selected using the input device within a predetermined length of time after the detection of the unlock sequence.

9. The processor of claim 8, wherein to detect that an unlock sequence has been input, the processor is configured to:
    detect, at a first time, a first input on the input device that selects a setpoint above the predetermined maximum temperature; and
    detect, at a second time subsequent to the first time, a second input on the input device that selects a lowest selectable setpoint.

10. The processor of claim 8, wherein to detect that an unlock sequence has been input, the processor is configured to detect that a power switch for the controller is switched to an on state at the same time that the input device is set to a lowest selectable setpoint.

11. The processor of claim 8, wherein the processor is further configured to activate an indicator to notify a user that the unlock sequence has been detected.

12. The processor of claim 8, wherein the unlock sequence includes inputs made using only the input device.

13. The processor of claim 8, wherein the predetermined maximum temperature is approximately 140° F.

14. A method for operating a water heater using a controller that includes a processor coupled to an input device configured to input at least one restricted setpoint above a predetermined maximum temperature, the method comprising:
    detecting, using the processor, that an unlock sequence has been input using at least the input device; and
    in response to the detection of the unlock sequence, permitting, using the processor, the water heater to operate at the restricted setpoint above the predetermined maximum temperature when the restricted setpoint is selected using the input device within a predetermined length of time after the detection of the unlock sequence.

15. The method of claim 14, wherein detecting that an unlock sequence has been input comprises:
    detecting, at a first time, a first input on the input device that selects a setpoint above the predetermined maximum temperature; and
    detecting, at a second time subsequent to the first time, a second input on the input device that selects a lowest selectable setpoint.

16. The method of claim 14, wherein detecting that an unlock sequence has been input comprises detecting that a power switch for the controller is switched to an on state at the same time that the input device is set to a lowest selectable setpoint.

17. The method of claim 14, wherein detecting that an unlock sequence has been input comprises detecting that an unlock sequence has been input using a rotary knob coupled to a potentiometer.

18. The method of claim 14, wherein detecting that an unlock sequence has been input comprises detecting that an unlock sequence has been input using only the input device.

19. The method of claim 14, further comprising notifying a user that the unlock sequence has been detected.

20. The method of claim 19, wherein notifying a user comprises activating a single light emitting diode.

21. The method of claim 20, wherein the single light emitting diode is a multi-color light emitting diode.

* * * * *